US006401802B2

(12) United States Patent
Cottingham

(10) Patent No.: US 6,401,802 B2
(45) Date of Patent: Jun. 11, 2002

(54) UNITS

(75) Inventor: Neil Douglas Cottingham, Arundel (GB)

(73) Assignee: Smiths Group PLC, London (GB)

( * ) Notice: Subject to any disclaimer, the term of this patent is extended or adjusted under 35 U.S.C. 154(b) by 0 days.

(21) Appl. No.: 09/809,061

(22) Filed: Mar. 16, 2001

(30) Foreign Application Priority Data

Mar. 16, 2000 (GB) .............................................. 0006179

(51) Int. Cl.[7] .............................. F24H 3/02; F28F 13/12; F28F 3/00
(52) U.S. Cl. ........................ 165/54; 165/166; 165/127
(58) Field of Search ................................ 165/165, 166, 165/127, 137, 96, 71, 54; 415/126, 127

(56) References Cited

U.S. PATENT DOCUMENTS

| 2,087,160 A | * | 7/1937 | Meyerhoefer | 165/127 |
| 3,982,588 A | * | 9/1976 | Darm | 165/166 |
| 4,040,804 A | * | 8/1977 | Harrison | 165/165 |
| 4,461,344 A | * | 7/1984 | Allen et al. | 165/165 |
| 4,556,105 A | * | 12/1985 | Boner | 165/165 |
| 4,569,391 A | | 2/1986 | Hulswitt et al. | 165/166 |
| 4,799,539 A | | 1/1989 | Atkin et al. | 165/54 |
| 5,295,473 A | * | 3/1994 | Neufeldt | 126/103 |
| 5,490,557 A | | 2/1996 | Taylor | 165/54 |
| 5,832,992 A | | 11/1998 | Van Andel | 165/165 |
| 6,293,337 B1 | * | 9/2001 | Strahle et al. | 165/166 |

FOREIGN PATENT DOCUMENTS

| DE | 25 33 490 A1 | 2/1977 |
| DE | 44 41 066 A1 | 5/1996 |
| FR | 2 287 025 | 4/1976 |
| FR | 2 533 682 | 3/1984 |
| GB | 891683 | 3/1962 |
| GB | 900087 | 7/1962 |

* cited by examiner

Primary Examiner—Henry Bennett
Assistant Examiner—Tho V Duong
(74) Attorney, Agent, or Firm—Connolly Bove Lodge & Hutz, LLP

(57) ABSTRACT

A heat-recovery unit includes an outer housing and a heat-recovery cell with two separate air passages therethrough opening on faces of the cell. The upstream face of each passage is adjacent and inclined at 90° to the downstream face of the other passage. A turret on the housing at each inlet and outlet is rotatable about its axis and has an angled coupling rotatable on the turret about an axis at right-angles to the axis of the turret. The inlet, upstream turrets each contain a filter and the outlet, downstream turrets each contain a centrifugal fan.

18 Claims, 3 Drawing Sheets

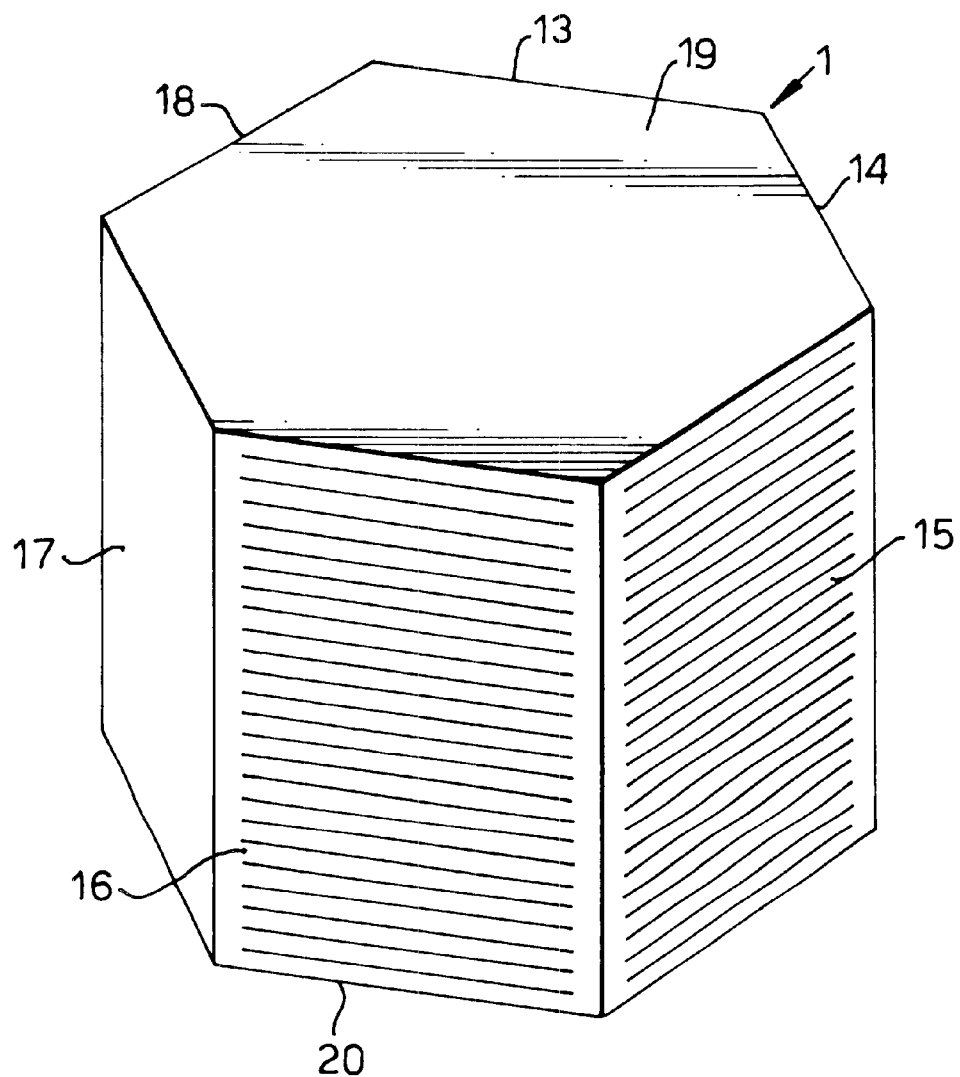

UNITS

BACKGROUND OF THE INVENTION

This invention relates to units and, more particularly, to heat-recovery units.

Heat-recovery units are used in buildings to transfer some of the heat in stale air exhausted from the building to fresh air brought into the building. These units usually contain a heat-recovery cell having multiple paths for the warm exhaust air and the cool inlet air separated by thermally-conducting walls, so that the heat from the exhaust air is transferred through the walls to the inlet air. These units can operate with a high efficiency but have several disadvantages. The units tend to be large and heavy, making transport, installation and servicing difficult. The weight of the units can complicate installation, since heavy duty fixings are required and reinforcement of building structure may be needed. The size of the units and the location of their inlets and outlets often complicates installation especially in restricted spaces and may require additional lengths of ducting and contorted paths. This can increase resistance to flow and reduce output.

BRIEF SUMMARY OF THE INVENTION

It is an object of the present invention to provide an alternative heat-recovery unit.

According to one aspect of the present invention there is provided a heat-recovery unit including a heat-recovery cell having two end faces at opposite ends of a first passage for warm air and two end faces at opposite ends of a second, separate passage for cool inlet air, and a box-like outer housing having a first inlet opening into the housing directly adjacent an upstream end face of the first passage, a first outlet opening from the housing directly adjacent a downstream end face of the first passage, a second inlet opening into the housing directly adjacent an upstream end face of the second passage, and a second outlet opening from the housing directly adjacent a downstream end face of the second passage, such that air flow through the housing between respective inlets and outlets is substantially unidirectional.

The upstream face at one end of the heat-recovery cell is preferably adjacent and inclined relative to the downstream face at the one end, the upstream face at the opposite end of the cell being adjacent and inclined relative to the downstream face at the opposite end. The adjacent faces are preferably inclined at an angle of substantially 90° relative to one another. The heat-recovery cell preferably has six vertical faces. At least one, and preferably each, of the inlets and outlets of the housing are provided with a rotatable turret. A fan may be mounted in the turret at each outlet.

According to another aspect of the present invention there is provided a heat-recovery unit including a heat-recovery cell and an outer housing having two inlets and two outlets for air passing through the unit, at least one of the inlets or outlets includes a generally cylindrical turret mounted on the housing for angular displacement about its axis, the turret having a port projecting substantially radially therefrom, and the turret including a fan arranged to move air through the housing via the turret and the port.

Each fan is preferably a centrifugal fan arranged axially on a turret. Each turret is preferably rotatably mounted with the housing such that it can be rotated to a number of predetermined positions. Each turret may be provided with an angled coupling, preferably with an angle of substantially 135°, which is rotatable about an axis at right ales to the axis of rotation of the turret. The coupling on the turret is preferably mounted with the turret such that it can be rotated to a number of predetermined positions. A filter may be mounted in the turret at each inlet. The housing may have a plurality of drain outlets located to allow water to drain from the housing at any orientation of the unit.

A heat-recovery unit according to the present invention will now be described, by way of example, with reference to the accompanying drawings.

BRIEF DESCRIPTION OF THE DRAWINGS

FIG. 3 is a perspective view of the cell.

DETAILED DESCRIPTION OF THE PREFERRED EMBODIMENT

Figure 1:
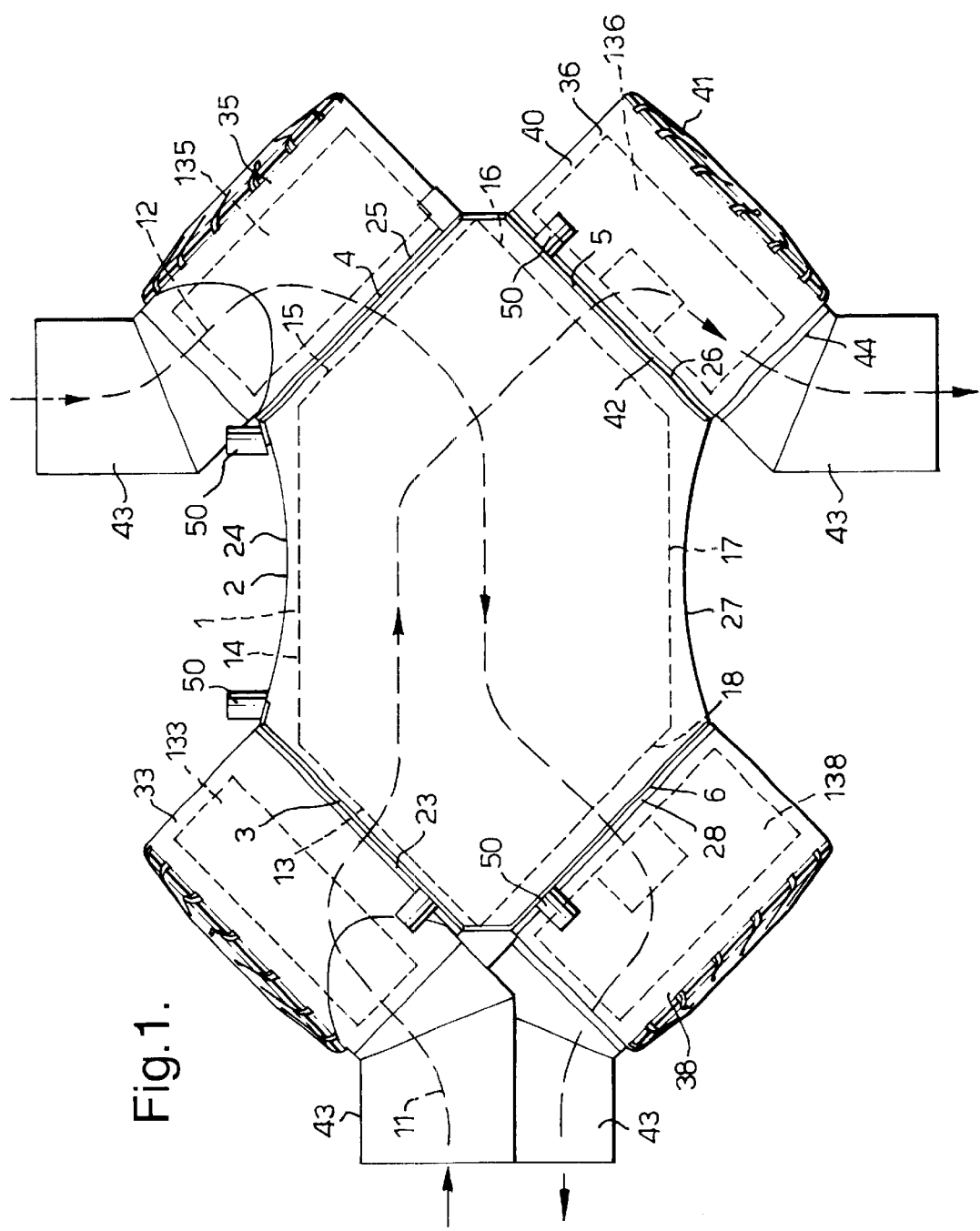
FIG. 1 is a plan view of the unit.
Figure 2:
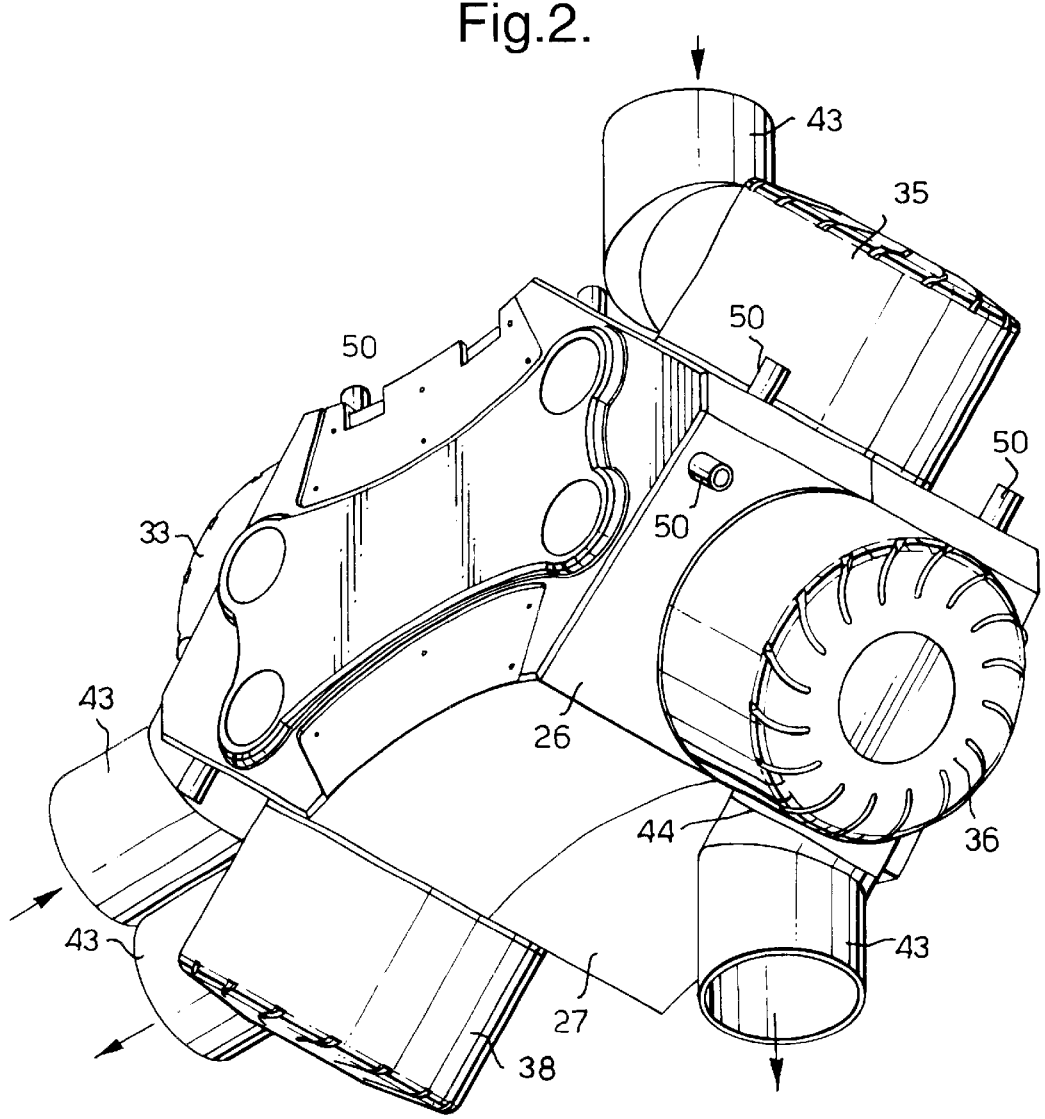
FIG. 2 is a perspective view of the unit.

The unit includes a heat-recovery cell 1 located within a housing 2 having two inlets 3 and 4, and two outlets, 5 and 6.

The cell 1 may be of conventional construction comprising a stack of heat-conducting plates 10 spaced to define two, separate air passages 11 and 12. The cell 1 is of lozenge shape having six major vertical faces 13 to 18 and parallel upper and lower surfaces 19 and 20. One of the vertical faces 13 provides an upstream inlet for one of the air passages 11 and is inclined at an angle of about 45° to the length of the cell. The opposite face 16 is inclined parallel to the face 13 and provides a downstream outlet from the passage 11. The faces 14 and 17 extend parallel to one another and to the length of the cell and are both closed. The vertical face 15 provides the upstream inlet for the other passage 12 and is inclined at an angle of about 45° to the length of the cell, in the opposite sense from the face 13. The sixth face 18 lies parallel to the face 15 and provides the downstream outlet for the second passage 12. The inlet and outlet faces 13 and 18 lie adjacent one another at one end of the cell, whereas the other inlet and outlet faces 15 and 16 lie adjacent one another at the opposite end of the cell.

The housing 2 is a box-like structure moulded of plastics material and has substantially the same shape as the cell 1. The interior of the housing 2 is thermally insulated such as by means of a foam material (not shown). The housing has six major vertical faces 23 to 28 located adjacent respective ones of the faces 13 to 18 respectively of the cell. The longitudinal faces 24 and 27 of the housing have a slightly concave profile and are closed. The faces 23 and 25 have circular openings providing the inlets 3 and 4 to the housing 2, whereas the faces 26 and 28 provide outlets 5 and 6. Each of the faces 23, 25, 26 and 28 support a respective turret assembly 33, 35, 36 and 38 comprising a cylindrical wall 40 closed at its outer end 41 and rotatably mounted at its inner end 42 on the housing 2 for angular displacement about its axis. The turret assemblies 33, 35, 36 and 38 also each include a port in the form of a tubular coupling 43 of dog-leg shape extending radially outwardly of the cylindrical wall 40. The coupling is bent at an angle of 135°. The tubular coupling 43 is mounted at its inner end on the cylindrical wall by means of a rotatable joint 44 so that it can be rotated about an axis extending at right angles to the axis of rotation of the turret assembly itself. The rotatable joints of the turrets on the housing and of the couplings on the turrets may include ratchets or detents so that the components locate in several predetermined fixed positions relative to one another and resist free rotation.

Two fans 136 and 138 are mounted on the housing 2 and extend within the turret assemblies 36 and 38 respectively. The fans 136 and 138 are oriented to rotate about the axis of the turret assemblies. The fans 136 and 138 are of a centrifugal type, which move air radially outwardly, and are arranged axially of the turret, so that the air flows out through the tubular couplings 43 of the turrets 36 and 38. The other two turret assemblies 33 and 35 are located at inlets 3 and 4 of the housing 2 and contain filters 133 and 135 to filter air passing into the heat recovery unit.

The housing 2 also has several short drain spigots 50 located at positions distributed about the housing so that water condensed within the housing will drain through one of the spigots regardless of the orientation at which the unit is mounted.

The unit is installed by connecting the coupling 43 of the first inlet turret 33 to one end of a conduit (not shown) the other end of which connects with an air inlet vent located in a room from which warm air is to be vented, such as, for example, a bathroom or kitchen. The coupling 43 of the turret 36 on the opposite side of the housing 2 is connected to a conduit leading to an external vent. The coupling 43 on the second inlet turret 35 is connected via conduit to an external vent and its opposite turret 38 has its coupling connected to a conduit leading to a room to which fresh air is to be supplied.

The turret assemblies 33, 35, 36 and 38 can be rotated to any convenient orientation to simplify connection with conduits and to avoid bends in the conduit. As illustrated, the turrets 35 and 36 are oriented with their couplings 43 extending outwardly, horizontal at right angles to the length of the unit, whereas the turrets 33 and 38 at the opposite end of the unit are oriented with the couplings extending parallel to the length of the unit. The turrets need not be oriented horizontally but could extend up or down, as desired. Because the inlet and outlet turrets can be oriented in many different positions, it greatly simplifies installation, especially in confined spaces.

When the fans 136 and 138 are operating, stale, warm air is drawn by the fan 136 through the inlet turret 33 and its filter 133, passing directly into the face 13 of the cell 1 and along the air passage 11. As the air passes through the cell 1, it gives up a part of its heat to the plates 10 of the cell before emerging from the opposite face 16 and directly into the turret assembly 36. Similarly, cool, fresh air is drawn by the fan 138 through the inlet turret 35 and its filter 135, passing directly into the face 15 of the cell 1 and along the air passage 12. As the air passes through the cell 1, it takes up a part of the heat stored in the plates 10, emerging warmed from the opposite face 18 and passing directly into the turret assembly 138. The two paths for air flow through the housing 2 are, therefore, substantially unidirectional, that is, the air is not diverted through more than about 45° during its passage between the faces of the housing. Because the inlets and outlets of the housing are located directly adjacent the faces of the heat recovery cell, air flows directly into and out of the cell, without the need for it to be diverted or channelled within the housing itself. The configuration takes advantage of the fact that the fans themselves naturally cause the air flow to be diverted through 90° so, by locating the fans in the rotatable turrets, there is no need for significant additional diversion of the air flow paths. This enables the size and weight of the housing to be kept to a minimum.

What I claim is:

1. A heat-recovery unit, comprising:
    a heat-recovery cell said heat-recovery cell having
        an upstream end face at one end of a first passage for warm air,
        a downstream end face at an opposite end of said first passage,
        an upstream end face at one end,
        a second, separate passage for cool inlet air, and
        a downstream end face at an opposite end of said second passage; and
    a box-like outer housing, said housing having
        a first inlet opening into said housing directly adjacent said upstream end face of said first passage,
        a first outlet opening from said housing directly adjacent said downstream end face of said first passage,
        a second inlet opening into said housing directly adjacent said upstream end face of said second passage, and
        a second outlet opening from said housing directly adjacent said downstream end face of said second passage,
    wherein air flow through said housing between respective inlets and outlets is substantially unidirectional, and
    said at least one of said first inlet opening, said second inlet opening, said first outlet opening, and said second outlet opening of said box-like outer housing including a rotatable turret coupled thereto,
    wherein said rotatable turret is coupled to said at least one of said first inlet opening, said second inlet opening, said first outlet opening, and said second outlet opening of said box-like outer housing so as to be freely rotatable about a longitudinal axis of said rotatable turret while remaining essentially fixed in an axial position along the longitudinal axis with respect to said box-like outer housing.

2. A heat-recovery unit according to claim 1, wherein said upstream end face at one end of said heat-recovery cell is adjacent and inclined at a first angle relative to said downstream end face at said one end,
    wherein said upstream end face at an opposite end of sad heat-recovery cell is adjacent and inclined at a second angle relative to said downstream end face at said opposite end.

3. A heat-recovery unit according to claim 2, wherein the first and second angles are approximately 90°.

4. A heat-recovery unit according to claim 1, wherein said heat recovery cell has six vertical faces.

5. A heat-recovery unit according to claim 1, wherein at least one of said inlets and a outlets of said outer housing is provided with a rotatable turret.

6. A heat-recovery unit according to claim 1, wherein each of said first and second inlets, and each of said first and second outlets of said box-like outer housing includes a rotatable turret.

7. A heat-recovery unit according to claim 1, wherein one of said first and second outlets includes a rotatable turret, wherein said heat-recovery unit further comprises a fan mounted in said rotatable turret.

8. A heat-recovery unit according to claim 7, wherein said fan is a centrifugal fan arranged axially in said rotatable turret.

9. A heat-recovery unit according to claim 1, wherein said outer box-like housing has a plurality of drain outlets located to allow water to drain from said outer box-like housing at any orientation of said heat-recovery unit.

10. A heat-recovery unit, comprising:
    a heat-recovery cell; and
    an outer housing, said outer housing including two inlets and two outlets for air passing through said unit, wherein at least one of said two inlets or said two outlets includes a cylindrical turret on said outer housing, said cylindrical turret being angularly displaceable about a longitudinal axis of said cylindrical turret, wherein said cylindrical turret has a port projecting essentially radially from said longitudinal axis.

11. The heat recovery unit of claim 10, wherein said cylindrical turret includes a fan arranged to move air through said outer housing via said cylindrical turret and said port.

12. A heat-recovery unit according to claim 11, wherein said fan is a centrifugal fan arranged axially in said cylindrical turret.

13. A heat-recovery unit according to claim 10, wherein said cylindrical turret is rotatably arranged on said outer housing and positioned in one of a plurality of angular positions.

14. A heat-recovery unit according to claim 10, wherein the port on said cylindrical turret is connected to an angled coupling that is rotatable about an axis which is essentially perpendicular to an axis of rotation of said cylindrical turret.

15. A heat-recovery unit according to claim 14, wherein a longitudinal axis of a first section of the angled coupling forms an angle of approximately 135° with respect to a longitudinal axis of a second section of the angled coupling.

16. A heat-recovery unit according to claim 14, wherein said angled coupling is rotatably arranged on said cylindrical turret and positioned in one of a plurality of angular positions.

17. A heat-recovery unit according to claim 10, further comprising a filter arranged in a cylindrical turret on at least one of said two inlets.

18. A heat-recovery unit comprising:

a heat-recovery cell,
said cell having a first passage therethrough for a warm gas, and a second passage therethrough for a cool gas,
said first and second passages being separate from one another and extending in opposing longitudinal directions within the heat-recovery cell,
said first and second passages opening at opposite ends of said cell through respective faces inclined at substantially 90° to one another; and
a housing enclosing said heat-recovery cell,
said housing having two inlets and two outlets aligned, respectively, with said opposite ends of said first and second passages,
each of said two inlets and said two outlet including a rotatable turret,
each said rotatable turret including an angled coupling,
said angled coupling being rotatable on said rotatable turret around an axis which is essentially perpendicular to an axis of rotation of said turret,
said angled coupling being arranged so as to form an angle of essentially 135° between a longitudinal axis of a first section of said angled coupling, and a longitudinal axis of a second section of said angled coupling,
wherein said longitudinal axis of the first section is aligned essentially perpendicular to the axis of rotation of said turret.

* * * * *